United States Patent [19]

Jesionowski et al.

[11] Patent Number: 5,715,424
[45] Date of Patent: Feb. 3, 1998

[54] APPARATUS AND METHOD FOR WRITING DATA ONTO REWRITABLE OPTICAL MEDIA

[75] Inventors: Leonard George Jesionowski; John Edward Kulakowski; Rodney Jerome Means, all of Tucson, Ariz.

[73] Assignee: International Business Machines Corporation, Armonk, N.Y.

[21] Appl. No.: 763,876

[22] Filed: Dec. 11, 1996

Related U.S. Application Data

[63] Continuation of Ser. No. 380,461, Dec. 8, 1994, abandoned, which is a continuation of Ser. No. 988,597, Dec. 10, 1992, abandoned.

[51] Int. Cl.⁶ ............................................... G06F 12/00
[52] U.S. Cl. ........................ 395/440; 395/470; 395/471; 395/182.22
[58] Field of Search ............................. 395/440, 471, 395/470, 182.22

[56] References Cited

U.S. PATENT DOCUMENTS

| | | | |
|---|---|---|---|
| 4,433,374 | 2/1984 | Hanson et al. | 395/465 |
| 4,533,995 | 8/1985 | Christian et al. | 395/250 |
| 4,788,672 | 11/1988 | Toyooka et al. | 369/32 |
| 4,916,605 | 4/1990 | Beardsley et al. | 395/483 |
| 4,984,103 | 1/1991 | Nigam | 360/74.1 |
| 5,065,354 | 11/1991 | Jons et al. | 395/182.03 |
| 5,179,652 | 1/1993 | Rozmanith et al. | 395/155 |
| 5,247,658 | 9/1993 | Barrett et al. | 395/601 |
| 5,261,055 | 11/1993 | Moran et al. | 395/834 |
| 5,263,154 | 11/1993 | Eastridge et al. | 395/182.04 |
| 5,276,835 | 1/1994 | Mohan et al. | 395/471 |
| 5,276,840 | 1/1994 | Yu | 395/855 |
| 5,287,468 | 2/1994 | Furuhashi | 395/825 |
| 5,446,853 | 8/1995 | Dean et al. | 395/410 |
| 5,519,831 | 5/1996 | Holzhammer | 395/182.2 |

OTHER PUBLICATIONS

"Error Recovery for Magneto–Optical Disks", Jan., 1990, IBM Tech. Discl. Bulletin, vol. 32, No. 8B, pp. 411–414.

*Primary Examiner*—Eddie P. Chan
*Assistant Examiner*—Reginald G. Bragdon
*Attorney, Agent, or Firm*—R. M. Sullivan

[57] ABSTRACT

An apparatus and method are provided for amortizing the adverse performance impact of an erase-write-verify process for rewritable optical disks, with its numerous delays, over multiple sectors. A block of data to be written to a sector on a particular track of the disk is transferred from the host to a cache storage device. When a predetermined number of blocks to be written to the track have accumulated in the cache, destaging will occur. Those sectors to which the blocks will be written are erased in a single pass. Then the blocks are written to the erased sectors in the next pass. Verification of the written data, if desired, can be performed in a third pass. Consequently, only two passes per track (or three, if verification is desired) are required to record data from the host to the disk instead of two passes (or three) per block using conventional methods and the seek and latency delays are also reduced. Multiple tracks can be destaged in an order established by a controller. Immediate destaging can occur if an event occurs requiring destaging which would otherwise jeopardize the integrity of the blocks of data retained in the cache.

3 Claims, 4 Drawing Sheets

| WRITE COMMAND | NUMBER OF SECTORS | TRACK/SECTOR ADDRESS | CACHE COMMAND | PRIORITY |
|---|---|---|---|---|

| DESTAGE COMMAND | NOT USED | NOT USED | NOT USED | NOT USED |
|---|---|---|---|---|

APPARATUS AND METHOD FOR WRITING DATA ONTO REWRITABLE OPTICAL MEDIA

This is a continuation of U.S. application Ser. No. 08/380,461, filed Dec. 8, 1994, now abandoned; which is a continuation of U.S. application Ser. No. 07/988,597 filed Dec. 10, 1992, now abandoned.

TECHNICAL FIELD OF THE INVENTION

This invention relates to rewritable optical subsystems and, in particular, to an apparatus and a method for amortizing the performance impact of the write, erase and verify passes over multiple sectors of a track when writing data to an optical disk.

BACKGROUND OF THE INVENTION

The recording surface of optical disks, like the recording surface of magnetic disks, is divided into a series of tracks (concentric or spiral) having a common rotational center. Each track is subdivided into sectors; data is typically written to and read from a disk in one-sector blocks. Hereinafter, the term "block" will refer to the data and the term "sector" will refer to a physical location on a disk to which a single block of data can be written.

Using known processes, certain optical media, such as magneto-optical (MO) and phase change media, are re-writable but currently require that data previously recorded onto a particular sector be erased before a new or revised block of data is recorded on that sector. Therefore, writing new or revised data onto a sector of such a disk requires a first rotation or pass of the disk while the sector is erased and a second rotation while the data is written. Verification is generally desired and requires a third rotation. In addition to the delay imposed by the erase and verify passes, delays are also incurred while the optical head moves radially inwardly or outwardly seeking the desired track (seek delay) and while the head waits for the desired sector on the track to rotate into position opposite the head (latency delay). The three-pass erase-write-verify procedure is currently performed separately for each block of data to be written.

In an actual application, a host processor (e.g., a computer to which a rewritable optical subsystem is interconnected as a peripheral) may write to tracks of a disk out of sequence, such as to various sectors of various tracks. Using a simplified example, the host may write a first block of data to a first sector on a first track, then another block to a first sector of a second track, then another to a second sector of the first track, then another to a first sector of a third track, then another to a second sector of the second track, then another to a third sector of the first track, etc. If a total of twelve blocks are to be written to sectors on three tracks, a conventional three-pass write procedure, requiring an erase pass followed by write and verify passes for each of the blocks, can use a total of thirty-six disk revolutions to write all of the data to the disk, a time consuming and inefficient procedure, and is subjected to significant seek and latency delays. (Twenty-four revolutions would be needed if verify was not desired.) Consequently, it is desirable to provide a two- or three-pass recording procedure for rewritable optical disks having increased efficiency and data throughput.

SUMMARY OF THE INVENTION

The present invention provides a three-pass write procedure having increased efficiency and data throughput with the use of a temporary storage cache to accumulate blocks of data transferred from a host processor for later recording onto sectors of a rewritable optical disk. In particular, the apparatus of the present invention comprises an interface for receiving blocks of data from a host to be written to corresponding sectors of an optical disk; a cache memory device coupled to the interface for storing the blocks of data; a controller for determining when a predetermined number of the blocks of data, destined for a track or contiguous tracks, have been stored in the cache; and a device, responsive to the controller, for destaging the predetermined number of blocks of data from the cache to the corresponding sectors. During destaging, triggered by reaching the predetermined number, the corresponding sectors are erased from the destination track or contiguous tracks on the disk during one pass and the blocks of data written from the cache to the erased sectors during the next pass. Consequently, the time delays imposed by seeking to the target track and the latency during the erase, write and verify passes are amortized over the predetermined number of sectors, thereby increasing the effective transfer rate of the disk subsystem. Furthermore, the process is transparent to the host: after the host transfers a block of data to the cache, it preferably receives an indication from the controller that the transfer was successful. The host is then free to perform other tasks, including transferring additional data to the cache, just as if the data was written directly from the host to the disk, while the actual writing of data to the disk occurs later in the background.

The cache can store blocks of data destined for corresponding sectors on multiple, non-contiguous tracks and the controller can establish a queue in which the destaging order of the tracks is maintained. When the predetermined number of blocks destined for one of the tracks has been transferred to the cache, the controller directs the destaging of those blocks to the corresponding sectors on the track. Blocks of data destined for sectors on contiguous tracks can be destaged in a similar manner across track boundaries.

The controller can be programmed to destage all blocks of data stored in the cache upon initiation by the drive when the disk is to be unloaded or when there is a power failure in the drive, or upon initiation by the host when an application program being executed on the host is to be terminated or has terminated abnormally, when the controller receives an indication of a failure in the host or when the controller receives a command from the host. To reduce the risk of data loss in the event of a failure in the optical disk subsystem, the cache preferably includes non-volatile memory from which the data can be restored.

The foregoing and other features and advantages of the invention will be apparent from the following more particular description of preferred embodiments of the invention, as illustrated in the accompanying drawings.

DETAILED DESCRIPTION OF THE INVENTION

Figures 1, 3A, 3B:
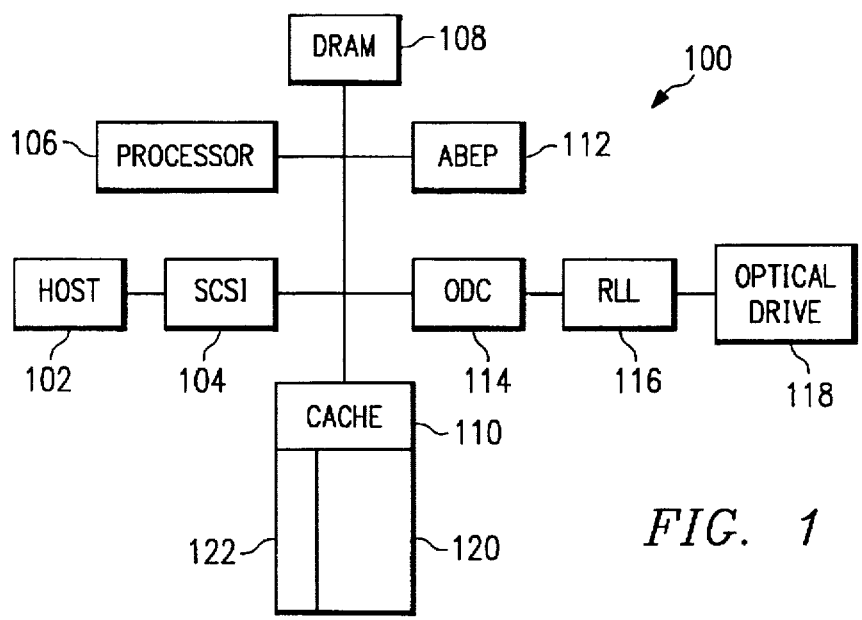
FIG. 1 is a block diagram illustrating the apparatus of an embodiment of the present invention.
FIG. 3A represents an exemplary write command block structure.
FIG. 3B represents an exemplary destage command block structure.

FIG. 1 is a block diagram illustrating an embodiment of a rewritable optical disk subsystem 100 of the present invention interconnected with a host processor 102, which can be any type of computer. An interface, such as a small computer system interface (SCSI) controller 104, is interconnected with the host 102 to receive/transmit blocks of data from/to the host 102. A first memory or cache storage device 110 and a controller or processor 106, having a second memory device, such as dynamic random access memory (DRAM) 108, are interconnected with the SCSI 104. An advanced burst error processor (ABEP) 112 and an optical disk controller (ODC) 114 are also interconnected with the SCSI 104. A run length limited (RLL) encoder 116 is interconnected between the ODC 114 and an optical disk drive 118 into which a rewritable disk (not shown), such as an MO or phase change disk, can be loaded.

Preferably, the cache 110 is non-volatile and will retain its contents when power is removed or during a reset following a host or subsystem failure. Alternatively, the cache 110 can be volatile or it can include a volatile portion 120 and a non-volatile portion 122. The volatile portion 120 can be conventional RAM. The non-volatile portion 122 can be a battery-backed RAM, a flash read only memory (ROM) or another known non-volatile memory device.

Figure 2:
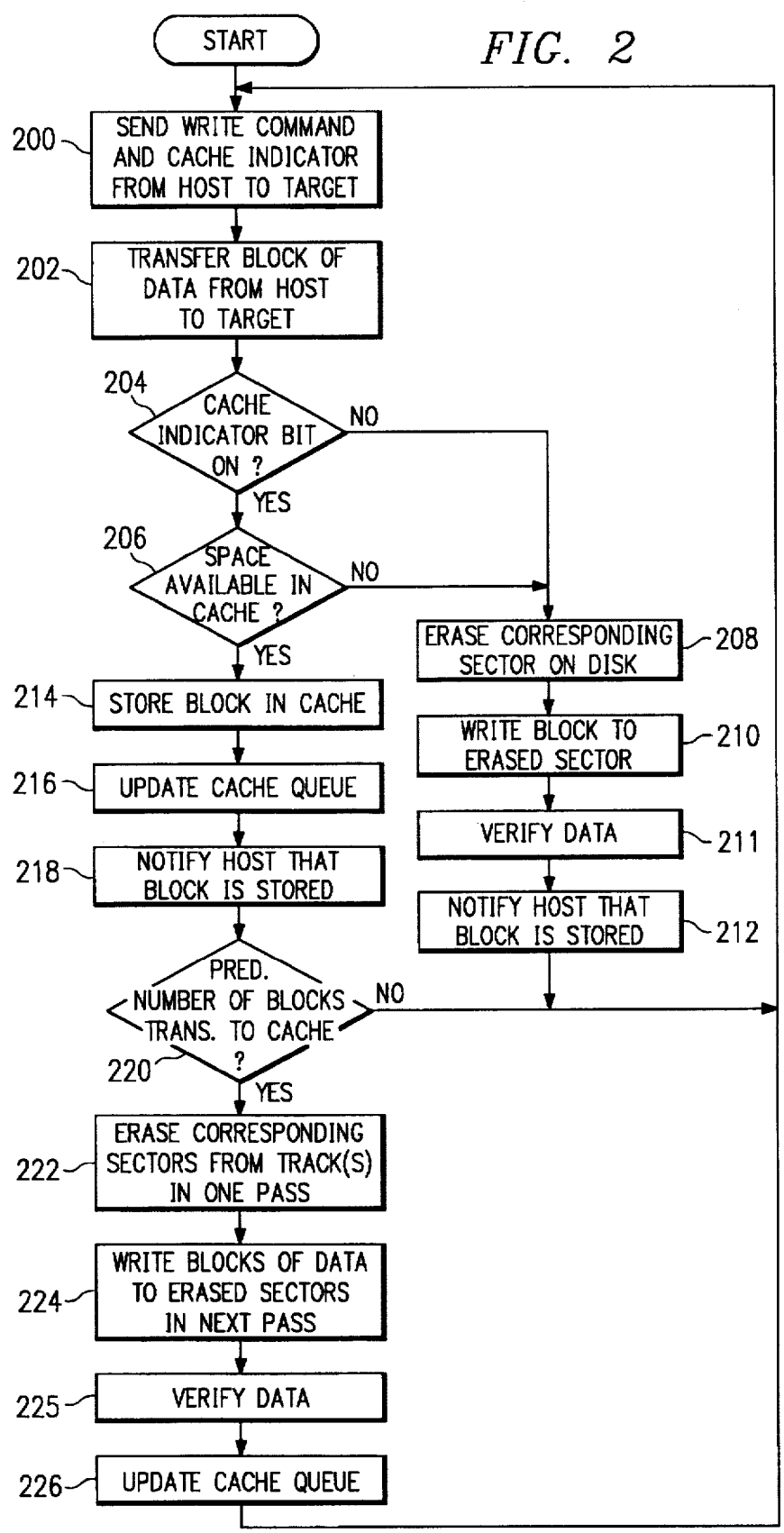
FIG. 2 is a flow chart illustrating the operation of the embodiment of FIG. 1.

The operation of the embodiment of FIG. 1 will now be described with reference to the flow chart of FIG. 2. When a block of data is to be written to a corresponding sector on a disk loaded in the drive 118, a command block is sent from the host 102 to the target SCSI 104 (Step 200). As illustrated in FIG. 3A, the command block can include a write command, the number of sectors, track and sector address information, a cache command indicator bit, and a priority bit. The data blocks are then transmitted by the host 102 to the SCSI 104 (Step 202). If the block is to be transferred to the cache 110, the indicator bit will be set. If the indicator bit is not set (Step 204), or if the cache 110 is full (Step 206), the block is written to the disk in a conventional three-pass erase-write-verify procedure (Steps 208, 210 and 211). The host 102 is notified that the block was stored (Step 212) and the subsystem 100 prepares to receive another block of data (back to Step 200).

If the indicator bit is set and space is available in the cache 110, the block is stored in the cache 110 (Step 214) under the control of the processor 106. If the cache 110 includes both the volatile portion 120 and the non-volatile portion 122, a copy of the block is stored in each. When the transfer to the cache 110 is successful, the processor 106 directs the SCSI 104 to transmit a signal to the host 102 that the blocks of data were received and stored (Step 218). This can be the same signal that would be transmitted to the host in a conventional optical disk subsystem when the data are written directly to the disk in a conventional three-pass erase-write-verify process (Step 208, 210 and 211) but is transmitted sooner than it would have been had a conventional process been employed because a transfer to the cache 110 is significantly faster than writing to the disk. Consequently, the host 102, having completed that transfer of data, is freed to perform other tasks sooner than it would have been had a conventional process been employed.

The processor 106 establishes an inventory in the cache 110 of the blocks of data stored in the cache 110 and of the destination tracks on the disk to which they will be destaged or written. Preferably, the processor 106 also establishes a queue in the cache 110 of the order in which the tracks will be destaged, the queue being updated (Step 216) when a block is transferred to the cache 110. For example, a track which has been the target of a greater number of blocks will be given a higher priority in the queue than one which has been the target of fewer blocks or, alternatively, a track given high priority by the host through use of the priority bit in the command. When a predetermined number of blocks which are to be written to corresponding sectors on a track of the disk have been stored in the cache 110 (Step 220), the processor 106 schedules the blocks for destaging through the ODC 114. The corresponding sectors on the track are erased in a first pass (Step 222). The blocks of data, after undergoing certain error correction processing by the ECC and CRC bytes in the ABEP 112, among other devices, are transmitted through the ODC 114, encoded by the RLL encoder 116 and written to the erased sectors in the second pass (Step 224). The data is verified in the third pass (Step 225) and the queue updated (Step 226). Following the queue update (Step 226), or if the predetermined number of blocks of data destined for a track or contiguous tracks has not accumulated in the cache 110 (Step 220), the subsystem 100 prepares to receive another block of data (back to Step 200).

As an example of the performance increase realized by the present invention, if the predetermined number of blocks to be accumulated in the cache for the track is four, the entire erase-write-verify process will take only three revolutions for all four blocks, instead of up to twelve if a conventional process is employed, regardless of the order in which the blocks were transferred by the host 102 to the SCSI 104. If each revolution requires 25 milliseconds at 2400 RPM, the time savings is about 225 milliseconds in addition to the time saved by reducing the seek and latency delays. And, as previously noted, an initial time savings is realized for the host 102 by transferring data from the host 102 to the cache 110 rather than to the disk.

It will be appreciated that the third pass for verification can be eliminated, if desired.

The processor 106 can also be programmed to recognize when blocks of data from the host 102 are to be written to sectors on contiguous tracks or range of tracks. When the predetermined number of such blocks has been stored in the cache 110, they can be destaged in the previously described manner across the track boundary to take advantage of the increased efficiency provided by the present invention.

Throughout the process of transferring blocks to the cache 110 and subsequently writing them to the disk, there may be circumstances in which the continued presence of data (which can include directories, volume table of contents and control structures, as well as user data) in the cache 110 must be destaged prior to the accumulation of the predetermined number of blocks for any of the destination tracks. Such circumstances, called destaging events, include host initiated events, such as the normal or abnormal termination of an application program currently being run on the host 102 or a failure in the host 102, and drive initiated events, such as an indication that the disk is about to be unloaded (intentionally or unintentionally) from the drive 118. In any of these events, the integrity of the data that has been transferred to the cache 110 could be jeopardized unless written immediately to the disk. Consequently, the processor 106 is interrupted when a destaging event occurs and directs the immediate destaging to the disk of all data in the cache 110. It will be appreciated that a polling process could be employed instead of an interrupt process. Following the method of the present invention, the blocks of data are destaged to the corresponding sectors on the destination tracks in the order established by the queue, with blocks for a given track being written and verified in two passes after an erase pass of the corresponding sectors. FIG. 3B is an exemplary block structure of a destage command sent by the host 102 during certain host initiated destaging events. In the structure shown, all data in the cache is destaged. Destaging of selected blocks can also be accommodated by including information regarding the number of sectors and track and sector addresses.

Figure 4:
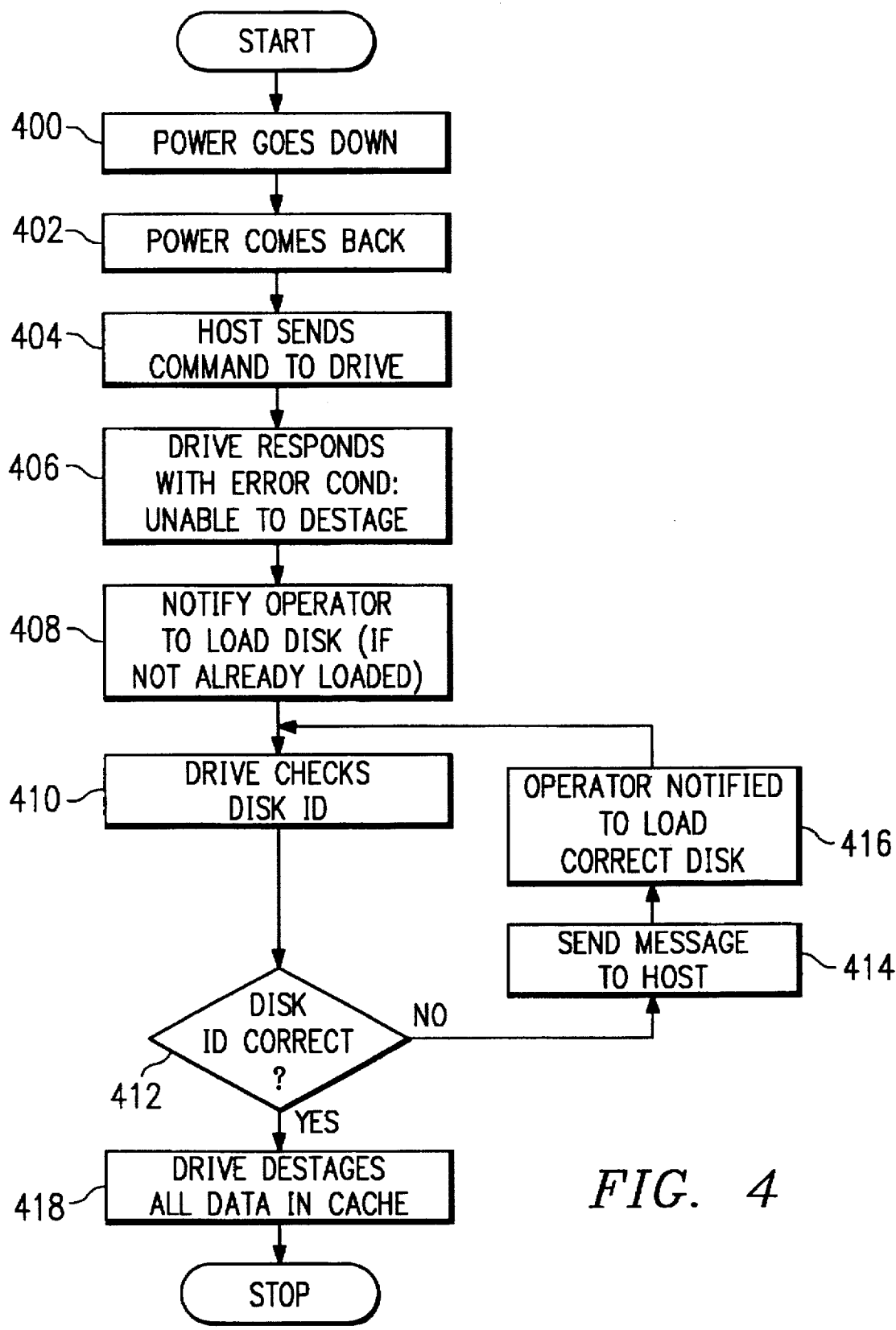
FIG. 4 is a flow chart illustrating an error recovery procedure following a power failure when a non-volatile cache is employed.

The benefit of employing a non-volatile portion 122 in the cache 110 can be illustrated with reference to FIG. 4, a flow chart of an error recovery procedure following a power failure. After a power failure occurs (Step 400), blocks previously transferred to the cache 110 remain intact in the non-volatile portion 122. When power is restored (Step 402), the host 102 sends a command to the subsystem 100 (Step 404) and receives back an error signal (Step 406) indicating that immediate destaging is required. A disk is mounted (Step 408) if the drive 118 is empty and the drive checks to determine whether the correct disk has been mounted (Steps 410 and 412). If not, a message is sent to the host (Step 414) and the operator notified to mount the correct disk (Step 416); the drive then rechecks (Steps 410–412). Once the correct disk is mounted, the drive destages the data (Step 418) by erasing appropriate sectors on the disk, writing the contents of the cache 110 to the disk and verifying the data as if the power failure had not occurred.

There may also be circumstances in which it is necessary or desirable to bypass the cache 110 and write a block of data directly to the disk. To accommodate such an option, the host 102 can turn off (reset) the cache command bit appended to the write command issued with every block to be written to the disk. When the processor 106 determines from an indicator bit that direct writing is required, the processor 106 interrupts any cache-to-disk operations and grants priority to the host 102; the data will then be written directly to the disk without intermediate cache storage.

Destaging may also be desirable when the resources of the subsystem 100 are otherwise idle. If blocks of data are not being written to the disk (either directly by the host 102 or indirectly through the cache 110), the processor 106 can initiate the immediate destaging of data from the cache 110 to the disk in the same manner as destaging events, described above.

To enhance data integrity, particularly in the absence of a non-volatile cache storage device, an application program can cause the host 102 to set the indicator bit of a write command (indicating that the associated block of data is to be transferred to the cache 110 rather that written directly to disk) if the application allows for the recovery from a system or I/O failure by restarting the application from the beginning and recreating all of the output files or if the application periodically "check-points" the state of the application and associated files in anticipation of a possible system or I/O failure. During each check-point operation, the application issues a destage command to the processor 106; with data safely stored on the disk, all files associated with the application will be in a known state at all times and a recovery can be made by the application from the last check-point using the last stored data.

The present invention can also accommodate an application program having multiple files open at one time, multiple applications executing on a host simultaneously, and multiple hosts associated with one optical drive. Subject to any destaging events as previously discussed, blocks of data destined for any track will be written from the cache 110 to the disk whenever the predetermined number of blocks for the track have accumulated. Alternatively, in a simplified process, the processor can direct the destaging of all blocks of data for all tracks whenever the predetermined number of blocks for any track has accumulated.

In addition to maintaining a queue of tracks, the processor 106 also preferably maintains in the cache 110 a record of the status of each block of data transferred to the cache 110. When a block of data is transferred from the host 102 to the cache 110, it is assigned the status of "valid, not destaged" which signifies that data on the corresponding sector of the disk is "backlevel" or superseded. Any read command to a "valid not destaged" block (from any host in a multiple host environment) must be satisfied from the block residing in the cache 100. When the block is successfully written from the cache 110 to the disk, it is assigned the status of "valid"; it may still reside in the cache 110 and can be read from the cache 110 or the disk. And, when a block is written directly from the host 102 to a sector on the disk, it is assigned the status of "invalid" signifying that a block of data previously transferred to the cache 110 from the host 102 and destined for the sector is backlevel. Such a block must be read from the disk.

Figure 5:
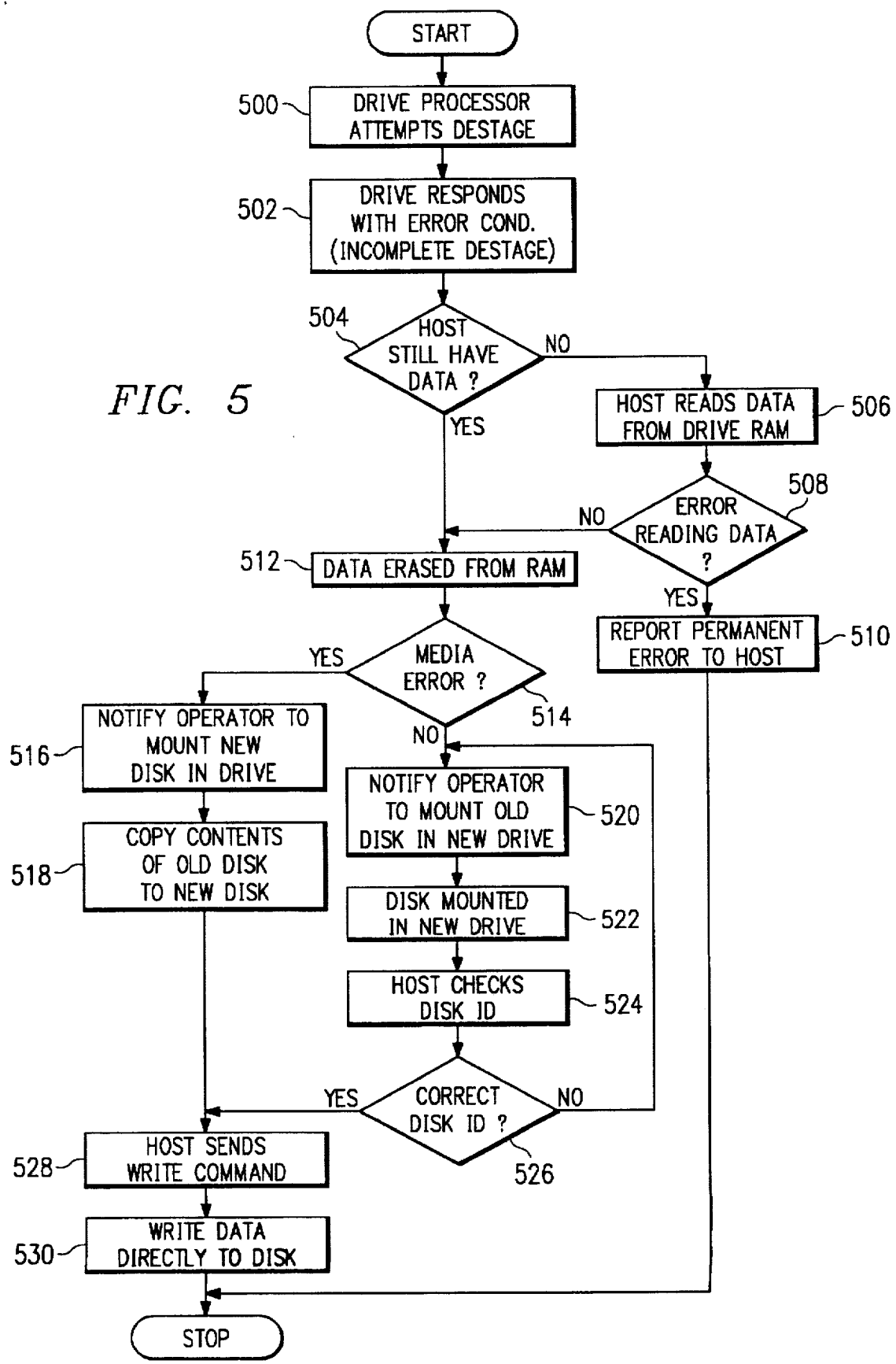
FIG. 5 is a flow chart illustrating an error recovery procedure following a destage failure.

A special error recovery procedure can also be invoked in the event that there is a destaging failure, as illustrated in the flow chart of FIG. 5. If the processor 106 attempts to destage blocks from the cache 110 (Step 500) and the drive 118 responds with an error condition signal (Step 502), it is determined whether the host 102 still has data to transfer (Step 504). If not, the host reads data from the drive RAM 118 that has been destaged (Step 506). If an error occurs in reading the data (Step 508), a message is sent to the host reporting a permanent error (Step 510) and the routine ends. If no read error is incurred, or if the host 102 still has the data to transfer, the host 102 sends a command to the drive to erase the data from the RAM (Step 512). If it is determined (Step 514) that there has been a media error, the operator is notified to mount a new disk (Step 516) and the contents of the old disk are copied to the new one (Step 518). If it is determined that there has not been a media error (Step 514) but, rather, a drive error, the operator is notified to mount the disk in a new drive (Steps 520 and 522) and the host checks the disk ID (Step 524). If the incorrect disk was mounted (Step 526), the operator is again notified to mount the old disk (Steps 520–524). When the correct disk has been mounted in the new drive (Step 526), or when the contents of the old disk have been copied to a new disk (Step 518), the host 110 send a write command to the subsystem 100 (Step 528) and the blocks of data not previously destaged are written to the drive (Step 530).

While the invention has been particularly shown and described with reference to preferred embodiments thereof, it will be understood by those skilled in the art that various changes in form and details may be made therein without departing from the spirit and scope of the invention.

What is claimed is:

1. An apparatus for storing data on a rewritable optical disk in an optical disk drive, comprising:

interface means for receiving blocks of data during multiple write operations from a host device to be written to corresponding sectors of a rewritable optical disk;

memory means coupled to said interface means for accumulating the blocks of data;

means for notifying the host device that a write operation is complete upon receipt of a block of data in said memory means;

processor means for:

indicating that data in each sector of the rewritable optical disk corresponding to each block of data accumulated in said memory means has been superseded, wherein a command from the host device to read selected data which has been accumulated in said memory means is to be satisfied from the block of data accumulated in said memory means;

arranging said blocks of data such that said blocks of data can be destaged to said corresponding sectors in a sequence that minimizes seek times along the rewritable optical disk;

destaging said blocks of data from said memory means to said corresponding sectors when a predetermined threshold has been reached in said memory means by:

erasing data from all of said corresponding sectors during a first single pass of the rewritable optical disk; and writing data in said blocks from said memory means to said corresponding sectors during a second single pass of the rewritable optical disk; and indicating that data in each sector of the rewritable optical disk which is destaged from said memory means has been updated, wherein a command from the host device to read selected data which has been accumulated in said memory means can be satisfied from a selected one of the block of data accumulated in said memory means and the data written to the corresponding sector.

2. A rewritable optical disk subsystem, comprising:

an optical drive into which a rewritable optical disk is loadable;

interface means for receiving blocks of data during multiple write operations from a host device to be written to corresponding sectors of a rewritable optical disk;

memory means coupled to said interface means for accumulating the blocks of data;

means for notifying the host device that a write operation is complete upon receipt of a block of data in said memory means;

processor means for:

indicating that data in each sector of the rewritable optical disk corresponding to each block of data accumulated in said memory means has been superseded, wherein a command from the host device to read selected data which has been accumulated in said memory means is to be satisfied from the block of data accumulated in said memory means;

arranging said blocks of data such that said blocks of data can be destaged to said corresponding sectors in a sequence that minimizes seek times along the rewritable optical disk;

destaging said blocks of data from said memory means to said corresponding sectors when a predetermined threshold has been reached in said memory means by:

erasing data from all of said corresponding sectors during a first single pass of the rewritable optical disk; and writing data in said blocks from said memory means to said corresponding sectors during a second single pass of the rewritable optical disk; and indicating that data in each sector of the rewritable optical disk which is destaged from said memory means has been updated, wherein a command from the host device to read selected data which has been accumulated in said memory means can be satisfied from a selected one of the block of data accumulated in said memory means and the data written to the corresponding sector.

3. A method for storing data on a rewritable optical disk mounted in an optical disk drive, comprising the steps of:

transferring a block of data, to be written to a rewritable optical disk, from a host device to a memory device;

notifying the host device that a write operation is complete;

indicating that data in a sector of the rewritable optical disk corresponding to the block of data accumulated in the memory device has been superseded, wherein a command from the host device to read the block data is to be satisfied from the block of data accumulated in said memory means and not from the data in the corresponding sector of the rewritable optical disk;

arranging said blocks of data such that said blocks of data can be destaged to said corresponding sectors in a sequence that minimizes seek times along the rewritable optical disk; and destaging said blocks of data from the memory device to said corresponding sectors of the rewritable optical disk when a predetermined threshold has been reached in the memory device, said destaging step further comprising:

erasing data from a plurality of sectors on the rewritable optical disk during a first single pass of the rewritable optical disk; and writing data in the predetermined number of blocks from the memory device to the corresponding plurality of sectors during a second single pass of the rewritable optical disk; and indicating that data in each corresponding sector of the rewritable optical disk which is destaged from the memory device have been updated, wherein a command from the host device to read selected data which has been accumulated in the memory device means can be satisfied from a selected one of the block of data accumulated in the memory device and the data written to the corresponding sector.

* * * * *